US00RE38540E1

(19) United States
(12) Reissued Patent
Bateman

(10) Patent Number: US RE38,540 E
(45) Date of Reissued Patent: Jun. 29, 2004

(54) MOVABLE TARGET SYSTEM IN WHICH POWER IS INDUCTIVELY TRANSFORMED TO A TARGET CARRIER

(76) Inventor: Kyle E. Bateman, 4001 Sherwood Dr., Provo, UT (US) 84604

(21) Appl. No.: 09/955,591

(22) Filed: Sep. 14, 2001

Related U.S. Patent Documents

Reissue of:
(64) Patent No.: 5,951,016
Issued: Sep. 14, 1999
Appl. No.: 09/005,436
Filed: Jan. 10, 1998

(51) Int. Cl.[7] ..... F41J 7/00
(52) U.S. Cl. ..... 273/406
(58) Field of Search ..... 273/406, 129 S, 273/121 A, 369, 359, 371, 372; 434/22; 336/115, 116, 117, 118, 119, 129, 130, 131, 132, 136, 73, 75, 77; 335/220, 222, 266, 268, 298; 104/284, 286, 293, 296, 303, 119

(56) References Cited

U.S. PATENT DOCUMENTS

| | | | | |
|---|---|---|---|---|
| 645,229 A | | 3/1900 | Muller | |
| 919,378 A | | 4/1909 | Pinkston | |
| 1,061,577 A | | 5/1913 | Whitney | |
| 1,266,348 A | | 5/1918 | Thompson | |
| 1,281,687 A | | 10/1918 | Stelling | |
| 2,586,958 A | | 2/1952 | Keller | 273/105.6 |
| 3,006,648 A | | 10/1961 | Devitt, Jr. et al. | 273/102.2 |
| 3,128,096 A | | 4/1964 | Hammond et al. | 273/102.2 |
| 3,324,832 A | | 6/1967 | McCain | 119/29 |
| 3,559,994 A | * | 2/1971 | Larsen | |
| 3,586,331 A | * | 6/1971 | Tickell, Jr. | |
| 3,614,102 A | | 10/1971 | Nikoden, Sr. | 273/105.6 |
| 3,865,373 A | * | 2/1975 | Knight | |
| 4,088,322 A | | 5/1978 | Nikoden, Jr. | 273/105.6 |
| 4,092,554 A | | 5/1978 | Quinn | |
| 4,170,077 A | * | 10/1979 | Pardes | |
| 4,222,564 A | * | 9/1980 | Allen et al. | |
| 4,505,481 A | | 3/1985 | Knight | 273/348 |
| 4,509,301 A | | 4/1985 | Head | 52/79.8 |
| 4,634,126 A | * | 1/1987 | Kimura | |
| 4,665,831 A | | 5/1987 | Matsui et al. | 104/165 |
| 4,741,418 A | | 5/1988 | Kaiser | |
| 4,889,346 A | | 12/1989 | Destry et al. | 273/406 |
| 5,207,304 A | | 5/1993 | Lechner et al. | |
| 5,467,718 A | * | 11/1995 | Shibata et al. | |
| 5,551,350 A | | 9/1996 | Yamada et al. | |
| 5,967,522 A | * | 10/1999 | Corcoran et al. | |

FOREIGN PATENT DOCUMENTS

| | | |
|---|---|---|
| JP | 53-124813 | 10/1978 |
| SU | 659-426 | 4/1979 |
| SU | 1105-342 A | 7/1984 |
| SU | 1318-461 A | 6/1987 |
| SU | 1402-450 A | 6/1988 |

* cited by examiner

*Primary Examiner*—Michael O'Neill
(74) *Attorney, Agent, or Firm*—Angus C. Fox, III

(57) ABSTRACT

An improved track-mounted movable target system is disclosed. Power is inductively transferred to a target carrier movable between first and second locations. The transferred power is used to power electrical equipment on board the target carrier. The electrical equipment may include electric motors, lights, solenoids, and control circuitry for the motors and solenoids. Preferred embodiments of the invention are implemented as track-based systems, as the track provides not only stability to the target carrier, but also protection from stray bullets to the conductive cable. For a first embodiment of the invention, power is transferred to a target carrier via a stationary inductor and a movable cable, which also provides motive force to the target carrier. For a second embodiment of the invention, power is transferred to a target carrier via a stationary cable and an inductor movable with the target carrier. For this second embodiment of the invention, electrical equipment on board the target carrier includes a drive motor for moving the carrier bidirectionally along the track. For both embodiments of the invention, communications with the target carrier may be achieved by modulating the frequency of the applied alternating current and demodulating it at the target carrier to provide control signals for control circuitry on board the target carrier.

34 Claims, 6 Drawing Sheets

MOVABLE TARGET SYSTEM IN WHICH POWER IS INDUCTIVELY TRANSFORMED TO A TARGET CARRIER

Matter enclosed in heavy brackets [ ] appears in the original patent but forms no part of this reissue specification; matter printed in italics indicates the additions made by reissue.

FIELD OF THE INVENTION

This invention relates to equipment for target ranges and, more specifically, to movable track-mounted target carriers having onboard electrical equipment to which power must be supplied from an external source. The invention also relates to induction-based electrical power transmission systems.

DESCRIPTION OF RELATED ART

Movable target systems typically employ a target carrier that is movable along a rail or track. There is often a requirement that the target attached to the carrier be movable (e.g., pivotable about its vertical central axis). The provision of linear movement to the carrier and movement to the target with respect to the carrier has resulted in various movable target system designs.

One solution to providing linear movement to a carrier and pivotal movement to a target makes use of a pair of parallel conductor strips mounted on the track which are electrically insulated from one another and between which a voltage potential is applied. Alternatively the track itself may serve as one of the conductors (typically at ground potential) and a single conductor strip or wire insulatedly mounted along the track serves as the other. In either case, the carrier is equipped with brushes or rollers which pick up electrical power from the conductors as the carrier moves along the track, much as a toy electric train derives its power from the rails. Such an arrangement is depicted in U.S. Pat. No. 3,128,096 to C. G. Hammond, et al. Power may be supplied to a first electric motor which drives the carrier along the track, as well as to a second electric motor which is used to pivot the target. Such a design suffers from the drawback that bullet fragments and other debris may alight on the conductor strips and thereby interfere with the electrical connection between the brushes and the conductor strip. Arcing between the brushes and the conductor strips will result in the formation of oxides which will increase the resistance at the connection and result in lower voltages being supplied to the electric motors. In addition, the brushes tend to wear with use, requiring periodic monitoring and replacement to prevent harmful arcing conditions.

Another design employed to provide linear movement to a carrier and pivotal movement to a target is depicted in U.S. Pat. No. 3,614,102 to J. Nikoden, Sr. A first insulated, single-conductor cable has one end spooled clockwise on a rotatable take-up drum which moves laterally about its central axis on a threaded shaft as the drum rotates. The opposite end of the cable is connected to a target carrier, providing motive force in one direction along a track and one conductor for power at the carrier. A second insulated cable has one end spooled counterclockwise on the rotatable take-up drum and the opposite end connected to the target carrier, thus providing motive force in a direction opposite that provided by the first cable and a second conductor for power at the carrier. The pitch of the threads on the shaft is equal to the diameter of the first and second insulated cables. One of the cables wraps around an idler pulley at the end of the track opposite the take-up spool mechanism. Such a design is rather complex and requires constant frequent lubrication of the threaded shaft and brush type contacts to transfer current to each cable at the take-up spool.

Still another design used to provide linear movement to a carrier and pivotal movement to a target utilizes a folded power cable which is dragged behind the carrier. Such a target system design is depicted in U.S. Pat. No. 4,889,346 to Donald M. Destry, et al. Computer printers having a track-mounted, movable print head have a similar cable connection arrangement. As the print head slides on its track, a ribbon cable having conductors encased in a resilient plastic sheath automatically folds upon itself and unfolds as the print head moves. Electricity for both a linear motion motor and a target pivoting motor are provided by the power cable which is attached at one end to the carrier, and at the other end to a power source. Abrasion to the insulated sheath covering the cable caused by frequent movement of the cable, as well as fatigue and eventual breakage of the cable conductors caused by frequent flexing of the cable are significant problems of this design. Another problem relates to the need to provide a mechanism which will maintain the power cable (which is no lightweight ribbon cable) neatly folded as the carrier moves toward the cable power source, regardless of the carrier's position on the track.

What is needed is a simple and reliable new system for providing linear movement to a track-mounted carrier and pivotal movement to a target attached to the carrier which dispenses with contact brushes, complicated cable spooling/despooling equipment, and folded power cables.

SUMMARY OF THE INVENTION

The present invention is embodied in an improved movable target system which meets the need heretofore expressed. Power is inductively transferred to a target carrier movable between first and second locations. The transferred power is used to power electrical equipment on board the target carrier. The electrical equipment may include electric motors, lights, solenoids, and control circuitry for the motors and solenoids. Preferred embodiments of the invention are implemented as track-based systems, as the track provides not only stability to the target carrier, but also protection from stray bullets to the conductive cable.

For a first embodiment of the invention, power is transferred to a target carrier via a stationary inductor and a movable cable, which also provides motive force to the target carrier. An idler pulley is mounted at one end of a track or rail, and a drive motor having a drive pulley is mounted near the opposite end thereof A target carrier, having an onboard power requirements, such as an electric target-pivoting motor, is movably mounted on the track or rail. A first end of an electrically-conductive drive cable is anchored to the carrier, and also connected to a first power-input terminal on the carrier. From the anchoring point on the carrier, the cable extends directly to the drive pulley. The cable wraps around the drive pulley, thus reversing directions. From the drive pulley, the cable extends all the way to the idler pulley, wraps around the idler pulley, and returns to the target carrier to which the second end of the cable is also anchored. However, the second end of the cable is connected to a second power-input terminal on the carrier, which is electrically insulated from the first power-input terminal. The drive cable, at some point along its length, passes near a stationary inductor. For preferred embodiments of the invention, the drive cable passes through the stationary inductor, which is a closed-loop ferromagnetic core, such as a toroid, having at least one turn of wire passing through the core's aperture. When an alternating current is applied to the stationary inductor, an alternating current of the same frequency is induced in the drive cable. This induced current, received at the first and second power-input terminals, is used to provide the target carrier's onboard power requirements. Some of the induced current may be rectified, filtered and regulated to provide DC power at the target carrier. The frequency of the applied alternating current may be modulated in order to send control signals to the target carrier. Microprocessor-based circuitry on board the target carrier decodes the modulated AC signals and converts them to binary signals which may be used to directly control functions on board the target carrier. Although not presently considered to be a preferred implementation of the invention, at least this first embodiment of the invention may be implemented as a trackless design by maintaining the cable taut, and suspending the target carrier directly from the cable.

For a second embodiment of the invention, power is transferred to a target carrier via a stationary cable and an inductor movable with the target carrier. One end of a conductive cable is connected to one terminal of a stationary alternating current source that is mounted near one end of an electrically-conductive track or rail having a channel which extends the length of the track, and to which the other terminal of the alternating current source is connected. The cable is routed within the channel to the target carrier, at which point it passes beneath a first in-channel guide pulley that is rotatably mounted on the target carrier. The cable then leaves the channel and passes over at least one out-of-channel guide pulley that is rotatably mounted on the target carrier. While the cable is outside the channel, it passes near or through an inductor affixed to the target carrier. For preferred embodiments of the invention, the drive cable passes through the inductor, which is a closed-loop ferromagnetic core, such as a toroid, having at least one turn of wire passing through the core's aperture. The cable is then routed beneath a second in-channel guide pulley that is rotatably mounted on the target carrier. From there, the cable is routed to an anchoring device at the opposite end of the track, which may incorporate a cable tensioning device. The cable anchoring device is electrically connected to the track. As the target carrier moves along the track, the guide pulleys mounted on the target carrier lift a short section of the cable from the track. When an alternating current is applied to the cable, an alternating current is induced in the inductor affixed to the carrier. The channel acts much like the outer conductor of a coaxial cable, in that its electromagnetic shielding minimizes power losses caused by energy radiated from the cable. For this second embodiment of the invention, electrical equipment on board the target carrier includes a drive motor for moving the carrier bidirectionally along the track. Thus the current induced in the inductor affixed to the target carrier is used to power not only the drive motor, but any other electrical equipment that may be on board the target carrier, such as motors which move the target with respect to the carrier. Some of the induced current may be rectified, filtered and regulated to provide DC power at the target carrier. Communications with the target carrier may be achieved by modulating the frequency of the applied alternating current. For a preferred embodiment of the invention, modulation involves alternating between two distinct frequencies so that a stream of serial binary data may be sent to the target carrier. Microprocessor-based circuitry on board the target carrier decodes the modulated AC signals and converts them to binary signals which may be used to directly control functions on board the target carrier. For example, the decoded signals may direct the drive motor to move the carrier forward or backward, or direct a target-pivoting motor to rotate the target to a desired position. Return communication for such information as hits on the target or status information can be effected by modulating the load at the coil at a frequency different from that of source alternating current. This modulation will be reflected in measurable current flow fluctuations at the alternating current source. These fluctuations can be decoded in much the same manner that frequency modulation is decoded by the circuitry on board the target carrier.

DETAILED DESCRIPTION OF THE INVENTION

A first embodiment of the invention may be characterized as a movable target system having a target carrier that is driven by a movable, looped cable along a track. Electrical power is transferred to the movable cable via a stationary inductor which is inductively coupled to the cable. Power induced in the cable is received by the carrier and used to power electrical equipment on board the carrier. This first embodiment of the invention will now be described.

Figure 1:
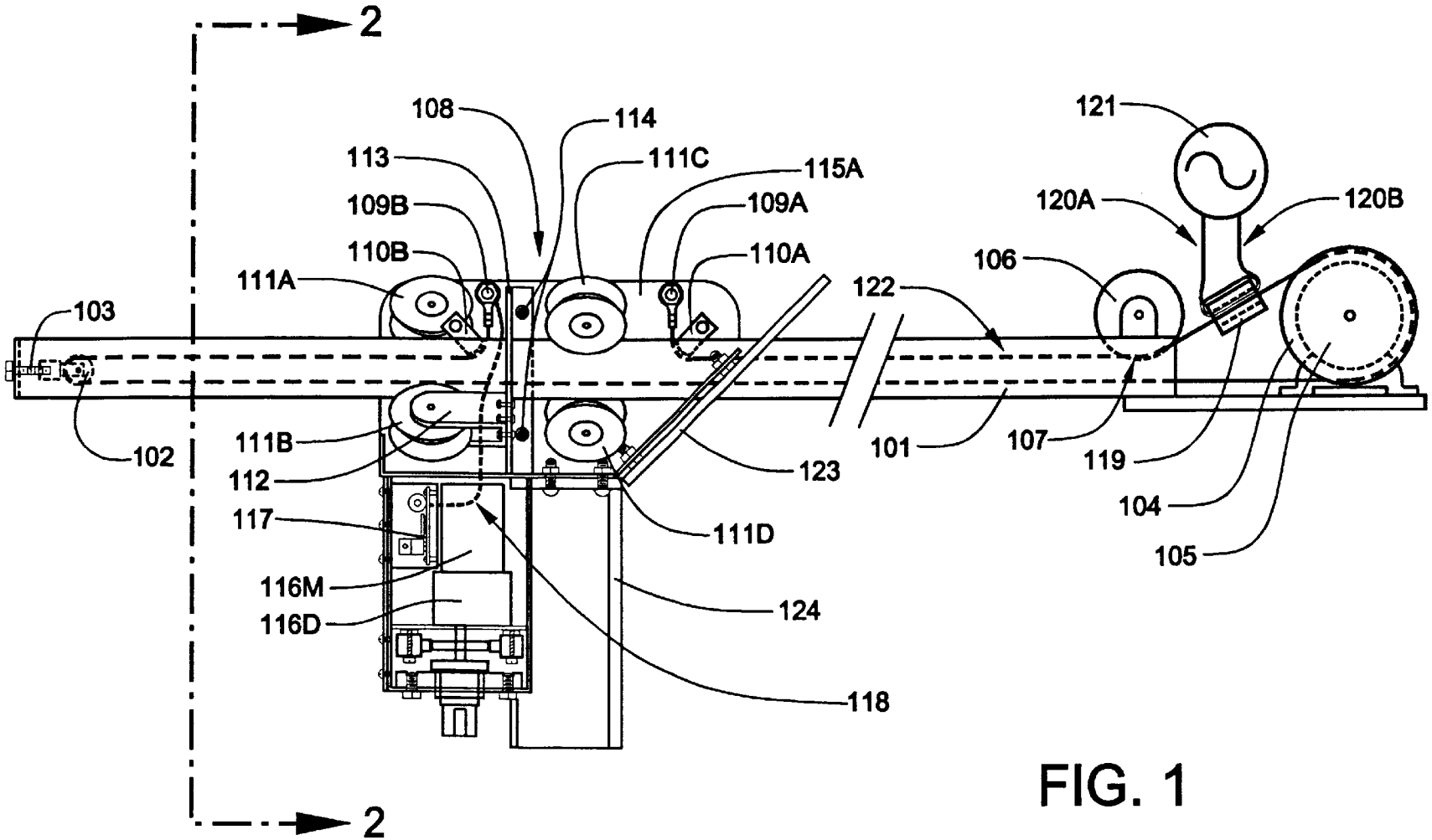
FIG. 1 is a side elevational cutaway view of a first embodiment of the improved movable target system.

Referring now to FIG. 1, an overhead track 101 of substantially rectangular, U-shaped cross section, having an upward-facing groove or channel (see FIG. 2, item 201) that extends along the length of the track, is provided between two locations between which a target must be movably positionable. A first idler pulley 102 incorporating a tensioning device 103, is mounted within the channel 201 at a first end of the track 101. A drive pulley 104, powered by a drive motor 105, is mounted in line with the channel 201 near the opposite, or second, end of the track 101. A second idler pulley 106 is mounted at the second end of the track 101 so that its grooved edge 107 extends into the channel 201. A target carrier 108, having power input connections 109A and 109B and anchoring brackets 110A and 110B, is movably mounted on the track 101 with grooved dielectric transport wheels 111A, 111B, 111C and 111D. The target carrier 108 is movable between first and second locations. The maximum travel is dictated by several factors. The absolute maximum travel will be the length of the track. This maximum travel will be limited, first, by the location of the first and second idler pulleys, which will obstruct movement of the carrier is either of them are physically located within the channel. The maximum travel may also be further limited by limit stops which may be affixed to the track. In any case, the term "inboard", as used in this disclosure refers to a direction toward the center of the track 101, while the term "outboard" refers to a direction away from the center of the track. Each of the grooved wheels rides on one of the four corners of the track. Each grooved wheel is affixed to the carrier by a bracket 112 (the bracket 112 is depicted for only grooved wheel 111B) which is riveted or fastened with screws to a bulkhead 113, which is, in turn, retained with screws 114 between opposing side plates 115A and 115B (not shown) of the target carrier 108. Anchoring brackets 110A and 110B are rigidly attached to side plate 115B. Electrical equipment, which may include a geared target pivoting motor 116 and electrical circuitry 117 for the controlling the target pivoting motor 116, is mounted on board the target carrier 108. An insulated wire 118 connects power input connection 109B to electrical circuitry 117. Power input connection 109A is attached directly to the target carrier housing, which includes side plate 115A.

Still referring to FIG. 1, a first end of an insulated, electrically-conductive cable 122 is secured to the first power input connection 109A. From this first power input connection 109A, the cable 122 extends to and is wrapped around the first anchoring bracket 110A, from which the cable 122 is routed under and partially around the second idler pulley 106, and looped around the groove of drive pulley 105. From the bottom of the drive pulley 105, the cable 122 then extends to the bottom of the first idler pulley 103, is looped around the groove of the first idler pulley 103 one-half turn, before returning to the target carrier 108. At the target carrier 108, the cable 122 is wrapped around the second anchoring bracket 110B, from which the cable 122 extends to the second power input connection 109B. The opposite, or second, end of the cable 122 is secured to the second power output connection 109B. An inductor device 119, characterized as having a coil with at least one turn of wire, the wire having first and second ends which, respectively, form first and second leads 120A and 120B, and a ferromagnetic core which at least partially surrounds the cable 122 and which concentrates the magnetic flux of the coil thereby increasing the coil's inductance. The ferromagnetic core may take a variety of shapes. For example, the core may be toroidally shaped, or substantially in the shape of a geometric solid enclosed by the surface generated by rotating a rectangle 360 degrees about an axis that is outside the rectangle, parallel to one side of the rectangle, and equiplanar with the rectangle. The core of inductor device 19 may also be a square shaped frame substantially in the shape of a geometric solid enclosed between two perimetrally parallel, equiplanar rectangles, one of which is smaller than and inside the other, as they are simultaneously moved along a line perpendicular to the plane in which they lie. The term "substantially" is used to indicate that the square corners of the surfaces so generated may be rounded. The leads 120A and 120B of inductance device 119 are coupled to an alternating current power source 121. In order to prevent stray bullets from piercing the target carrier 108, it is protected on the side facing the marksman with an angled, tempered steel plate 123. Likewise, the target-pivoting motor 116 and the onboard control circuitry 117 are protected with a vertically-oriented, tempered steel plate 124. 41

Still referring to FIG. 1, it should be readily apparent that as the drive pulley 105 is rotated by the drive motor 106, the target carrier 108 will move, in response to the movement of cable 122, until it reaches the limit of its travel in one direction along the track 101. Likewise, when the rotational direction of the drive pulley 105 is reversed, the target carrier 108 will travel in the opposite direction along the track 101 until it reaches the limit of its travel at the opposite end of the track 101. Additionally, when an alternating current is applied to the power input leads 120A and 120B of inductor device 119, a current is induced in electrically-conductive cable 122. For the preferred embodiment of the invention, alternating current of various frequencies within a range of about 20 to 30 kilohertz and a potential of approximately 170 volts is applied to inductor device 119, which has 6 turns of wire thereon. Thus, the current induced on the cable 122 is about one-sixth of the applied voltage, or a nominal voltage of about 24 volts. As 24 volts is the maximum voltage that is still considered low-voltage, no special shielding or ground-fault detection devices are required as safety measures. Although the induced alternating current could be utilized to directly power an AC target-pivoting motor, for the preferred embodiment of the invention, nearly all the induced AC current is rectified, filtered and regulated to provide 5 volts DC, which is used to power all electrical equipment on board the target carrier 108. Only a very small portion of the induced AC current is used as is for sampling the frequency of the AC power applied to inductor device 119. The particular frequency applied to inductor device 119 is used as a control signal for motor control on board the target carrier 108. This will be later explained in more detail with reference to FIG. 3. Although it is conceivable that a movable target system could be designed using an uninsulated cable in place of the insulated cable 122, an uninsulated cable must be adequately isolated from the track 101 and any other grounded items. The use of a steel cable having an insulating sheath greatly simplifies design and construction of the movable target system. The insulating sheath may be formed from a material such as nylon, polytetrafluoroethylene, or other flexible polymeric dielectric material. In any case, electrical contact to an end of the cable 122 is made by stripping the insulated sheath from the end thereof and securing the stripped end to the terminal using one of many known techniques. A lug-type connector crimped to the end of the cable and secured to power input connections 109A or 109B with a threaded nut is depicted.

Figure 2:
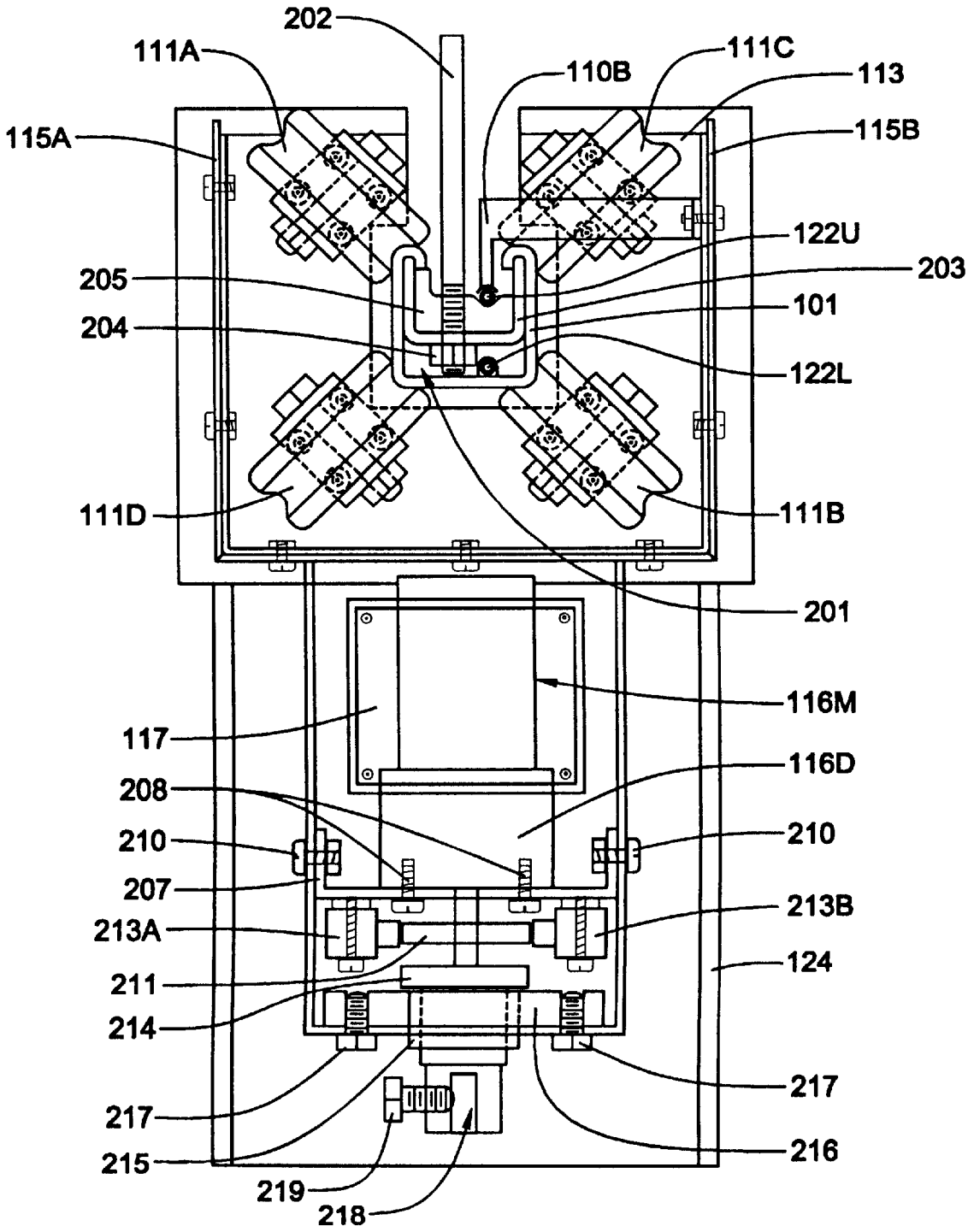
FIG. 2 is a cross-sectional view of the first embodiment of the improved movable target system of FIG. 1 through line 2—2.

Referring now to the cross-sectional view of FIG. 2, the rectangular, U-shaped cross-section of track 101 is readily visible, as is the channel 201 within the U-shaped cross section. At certain locations along the track, the track 101 is suspended from a threaded overhead support rod 202 that is anchored to a bracket 203 that is slidable within the track 101. As the threaded nut 204 is tightened on rod 202, both the bracket 203 and the rod 202 exert a force on the track, thus securing the support rod 202 to the track 101. A slidable plastic insert 205 provides separation between the upper strand 122U and the lower strand 122L of drive cable 122. The target carrier 108 rolls along the track 101 on two pairs of perpendicularly angled, spaced-apart plastic guide wheels which are rotatably affixed to the carrier 108, as heretofore described. Though not evident from this cross-sectional drawing, the first pair of guide wheels, 111A and 111B, are nearer the viewer than the second pair of guide wheels, 111C and 111D. Each wheel rides on one of the four edges, or corners, of the track 101. Such a mounting arrangement provides a high degree of stability to the target carrier 108 as it moves along the track 101. The bulkhead 113, which is seen in FIG. 1 as an edge of a piece of sheet metal and folded tabs by which it attached to side plate 115A by threaded screws 114, is shown more clearly in this view. Both the bulkhead 113 and the angled steel plate 123 have a cutout 206 to clear the track 101 and overhead support rod 202. In this view, the target pivoting motor 116M and its geared-drive mechanism 116D are more clearly seen. The geared-drive mechanism 116D is mounted on a support plate 207 with screws 208. The support plate is attached to the lower carrier housing 209 with screws 210. A notched cam wheel 211 is affixed to the output shaft 212 of the target-pivoting motor 116M/116D. Two of three micro switches 213A, 213B and 213C, which detect the location of the notches on the cam wheel 211 are also visible. A target attachment fitting 214 is rotatably positioned within an oil impregnated sintered brass bushing 215, which is pressed into base plate 216, which secured to lower carrier housing 209 with bolts 217. A hole 218 in the target attachment fitting 214 is adapted to receive a cylindrical rod to which the target is attached (neither the rod nor the target is shown). The rod is retained within fitting 214 by securing bolt 219.

Figure 3:
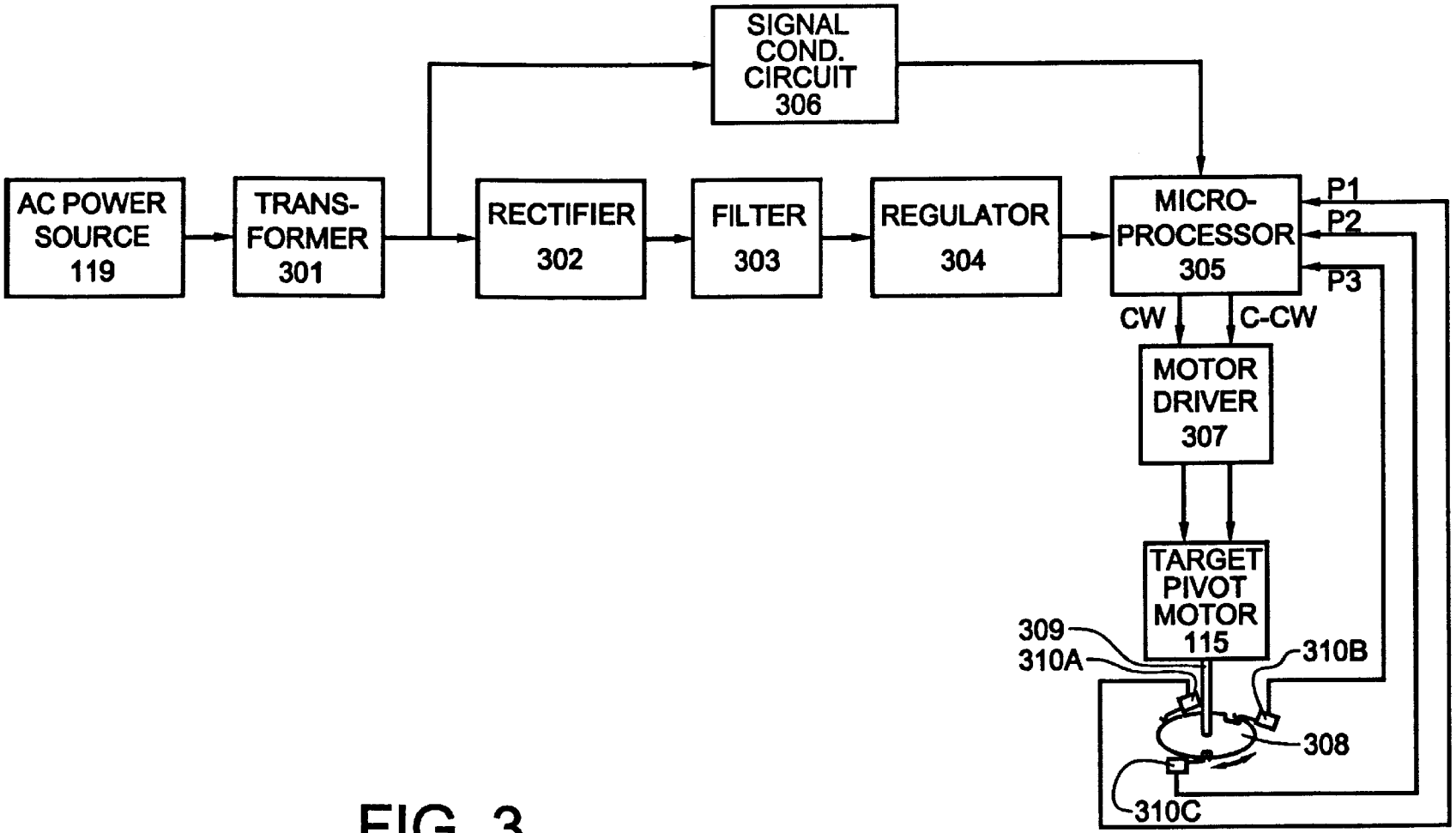
FIG. 3 is a block schematic diagram of the electrical circuitry and electrically-powered equipment employed in connection with the first embodiment of the improved movable target system.

Referring now to the block schematic diagram of FIG. 3, the circuitry 117 on board the target carrier 108 includes all circuit items labeled 302–307. The alternating current power source 121 is transformed by inductor device 119 (which functions as a primary transformer winding) and the insulated drive cable 122 (which functions as a secondary transformer winding), which together constitute power transformer 301, into the induced alternating current received at power input connections 109A and 109B. The induced AC current is rectified by diode rectifier circuit 302, filtered by filter circuit 302 and regulated by regulator circuit 304. The regulated DC current powers a microprocessor 305, which samples the frequency of the induced AC power through signal conditioning circuit 306. The microprocessor 305 decodes the received AC frequency signal into position information for the target-pivoting motor 116M. In response to both this decoded signal and signals P1, P2 and P3 received from micro switches 213A, 213B, and 213C, respectively, which make rubbing contact with the edge of a notched cam wheel 211 affixed to the target-pivoting motor shaft 212, either a clockwise rotation signal or a counter-clockwise rotation signal is sent from the microprocessor 305 to a motor driver circuit 307, which sends DC power to target-pivoting motor 116M in normal or reverse polarity until the desired target position is achieved. It should be emphasized that all electrical equipment on board the target carrier is powered by the regulated DC current derived from the current induced in the drive cable 122.

A second embodiment of the invention may be characterized as a movable target system having a target carrier movable along a track which encloses a stationary cable to which alternating current is applied. The carrier incorporates onboard electrical equipment that at least includes an electric transport motor. The onboard electrical equipment receives it power from an inductor which slides along the stationary cable. This second embodiment of the invention will now be described.

Figure 4:
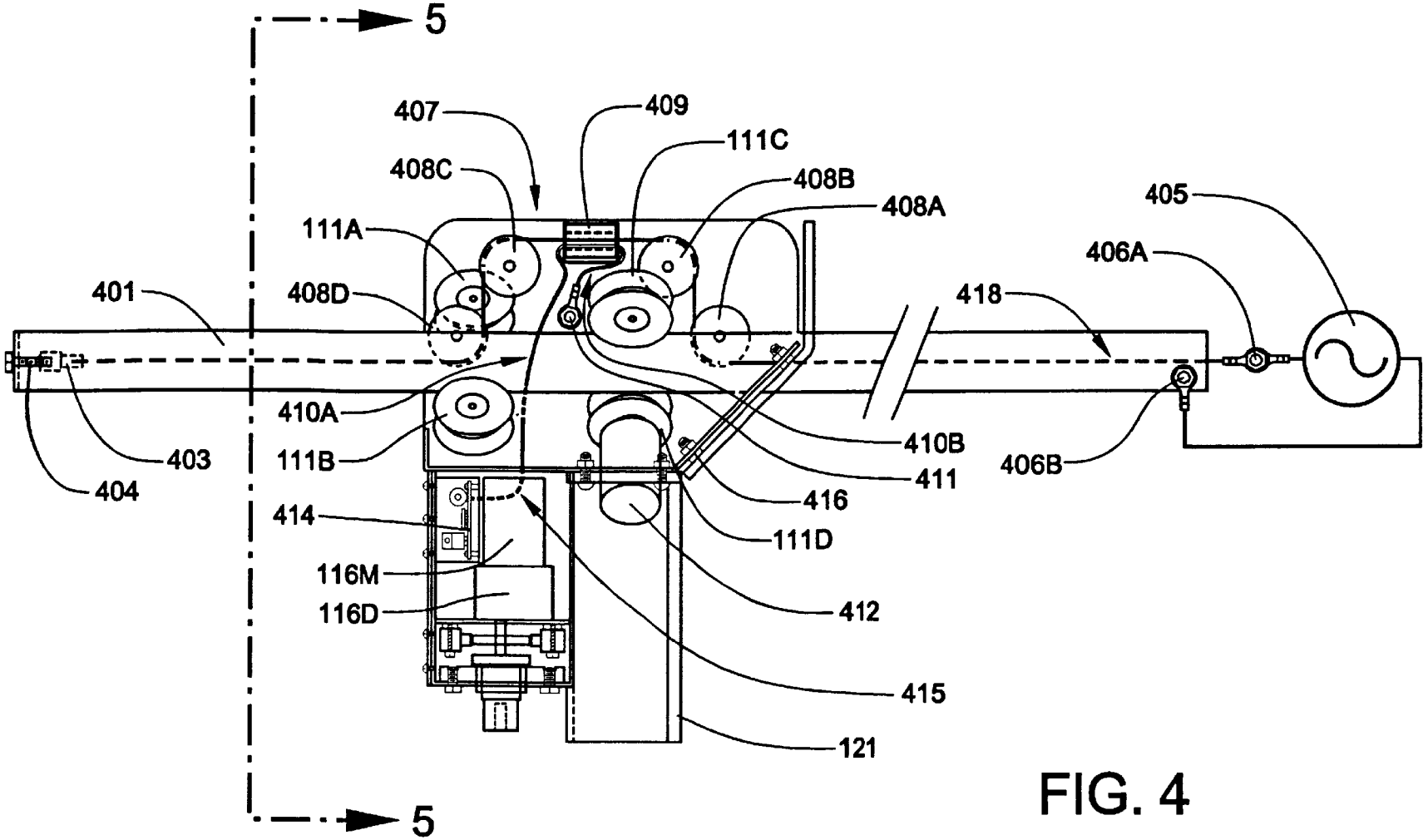
FIG. 4 is a side elevational cutaway view of a second embodiment of the improved movable target system.

Referring now to FIG. 4, a conductive overhead track 401 of substantially rectangular, U-shaped cross section, having an upward-facing groove or channel (see FIG. 5, item 501) that extends along the length of the track, is provided between two locations between which a target must be movably positionable. A first cable anchoring device 403A incorporating a cable tensioner 404 is longitudinally aligned with and positioned at one end of the track 401, being electrically connected thereto. An alternating current source 405, having first and second power output connections 406A and 406B, respectively, is positioned at the opposite end of the track. The first output connection 406A is electrically connected to the track 401. A target carrier is 407 is movably mounted on the track 401 in the same way that the target carrier 108 is movably mounted to track 101 (see the description of FIG. 1). The target carrier 407 is equipped with a cable lifting device consisting of four idler pulleys 408A, 408B, 408C and 408D. An inductor device 409 is affixed to the target carrier between idler pulleys 408B and 408C. The physical characteristics of the inductor device 409 are fundamentally the same as those identified for inductor device 119 of the first embodiment of the invention. A first lead 110A of inductor device 409 is electrically connected to the target carrier frame at input connection 411. The target carrier 407 is also equipped with onboard electrical equipment which includes a drive motor 412 having a resilient drive wheel 413 which rides against the lower surface of the track 401, a target-pivoting motor 116M having a geared drive 116D, and circuitry 414 for controlling the operation of both motors. An insulated wire 415, which makes electrical connection to the other, or second, lead 110B of inductor device 409, is coupled to the circuitry 414. In order to prevent stray bullets from piercing the target carrier 407, it is protected on the side facing the marksman with a tempered steel plate 416 that is positioned both vertically and angularly with respect to the marksman. Likewise, the target-pivoting motor 116M/116D and the onboard control circuitry 414 are protected with a vertically-oriented, tempered steel plate 121. A first end of an insulated conductive cable 418 is conductively anchored to the first cable anchoring device 403A, from which the cable 418 extends to a second cable anchoring device 403B, which is longitudinally aligned with the channel of track 401, stationary with respect the track 401, and electrically connected to the second power output connection 406B. Between the second cable anchoring device 403B and the first cable anchoring device 403A, the cable is routed to the target carrier 407, where it passes beneath idler pulley 408A, out of the channel 401 and over idler pulley 408B, through the inductor device 409, over idler pulley 408C, back into the channel 401 and under idler pulley 408D. When a source alternating current is applied to the conductive cable 413, a corresponding alternating current is induced in the inductor device 409. Some of the induced current may be rectified, filtered and regulated to provide DC power at the target carrier. Communications with the target carrier 407 may be achieved by modulating the frequency of the applied alternating current at AC source 405. For a preferred embodiment of the invention, modulation involves alternating between two distinct frequencies so that a stream of serial binary data may be sent to the target carrier. Microprocessor-based circuitry 414 on board the target carrier decodes the modulated AC signals and converts them to binary signals which may be used to directly control functions on board the target carrier. For example, the decoded signals may direct the drive motor to move the carrier forward or backward, or direct a target-pivoting motor to rotate the target to a desired position. Nearly all the AC current induced in inductor device 409 is rectified, filtered and regulated to provide 5 volts DC, which is used to power all electrical equipment on board the target carrier 407. Only a tiny portion of the induced AC current is used as is for sampling the frequency of the AC power applied to cable 418. A more detailed explanation of communications procedures will be subsequently given with reference to FIG. 6.

Still referring to FIG. 4, it should be readily apparent that as the target carrier 407 is moved in either direction along the track 401 by drive motor 412 between the limit of its travel as afforded by the length of the track, the cable will be lifted out of the channel by idler pulleys 408A, 408B, 408C and 408D within the confines of the target carrier 407. In this way, the cable 418 is protected from stray bullets. In addition, the channel 501 within the track 401 acts much like the outer conductor of a coaxial cable. Power losses caused by energy radiated from the cable 418 are minimized.

Figure 5:
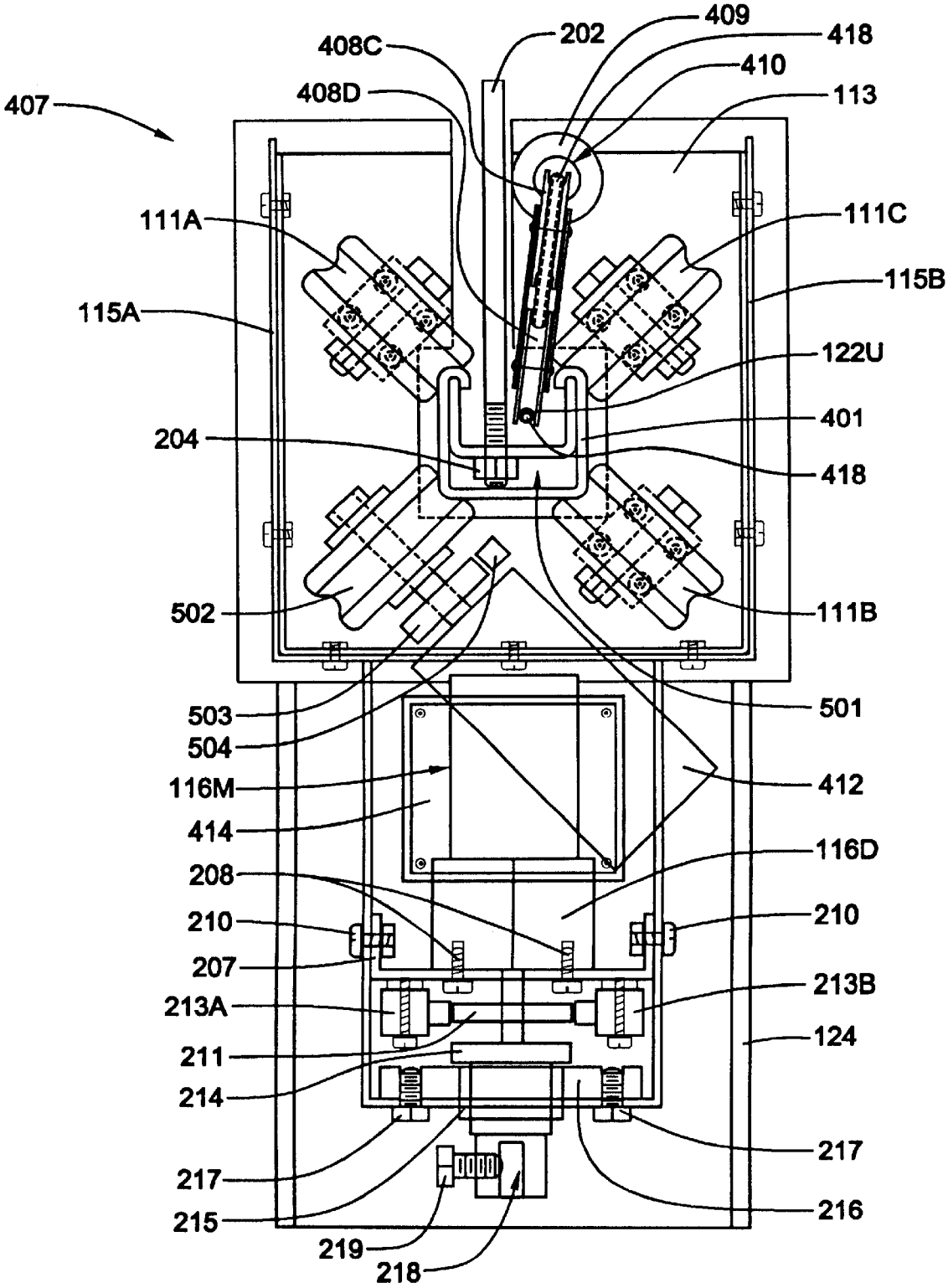
FIG. 5 is a cross-sectional view of the second embodiment of the improved movable target system of FIG. 4 through line 5—5.

Referring now to the cross-sectional view of FIG. 5, the rectangular, U-shaped cross-section of track 401 is readily visible, as is the channel 501 within the U-shaped cross section. In order to provide clearance for idler pulleys 408A, 408B, and 408C and 408D, track 401 is somewhat wider than track 101. Many features visible within FIG. 5 are identical to those of FIG. 2. This description will cover only the basic differences. The most notable difference is the presence of the idler pulleys, which extract the cable 418 from the channel 501 within the confines of the target carrier 407. Only idler pulleys 408C and 408D are visible in this view. Also notable is the presence of a single strand of cable 418, as the cable is not looped within the channel 501. In addition, because of clearance requirements, there are no plastic inserts such as item 205 of FIG. 2. Idler pulleys 408A, 408B, 408C and 408D may be secured to the target carrier 407 in much the same manner as the grooved transport wheels 111A, 111B, 111C and 111D are attached. However, grooved transport wheel 111D is replaced with a grooved drive wheel 502 that is mounted on the output shaft of drive motor 412, which may be secured to the target carrier frame with a mounting bracket (not shown). The drive motor 412 is also equipped with a pulse generator 503 and a sensor 504, which will be described in more detail with reference to FIG. 6. In this cross-sectional view, the end of inductor device 409 is seen. The central aperture 505 of a closed-loop ferromagnetic core of device 409 is readily visible in this view. For the sake of simplicity, the windings on inductor device 409 are not shown in this view.

Figure 6:
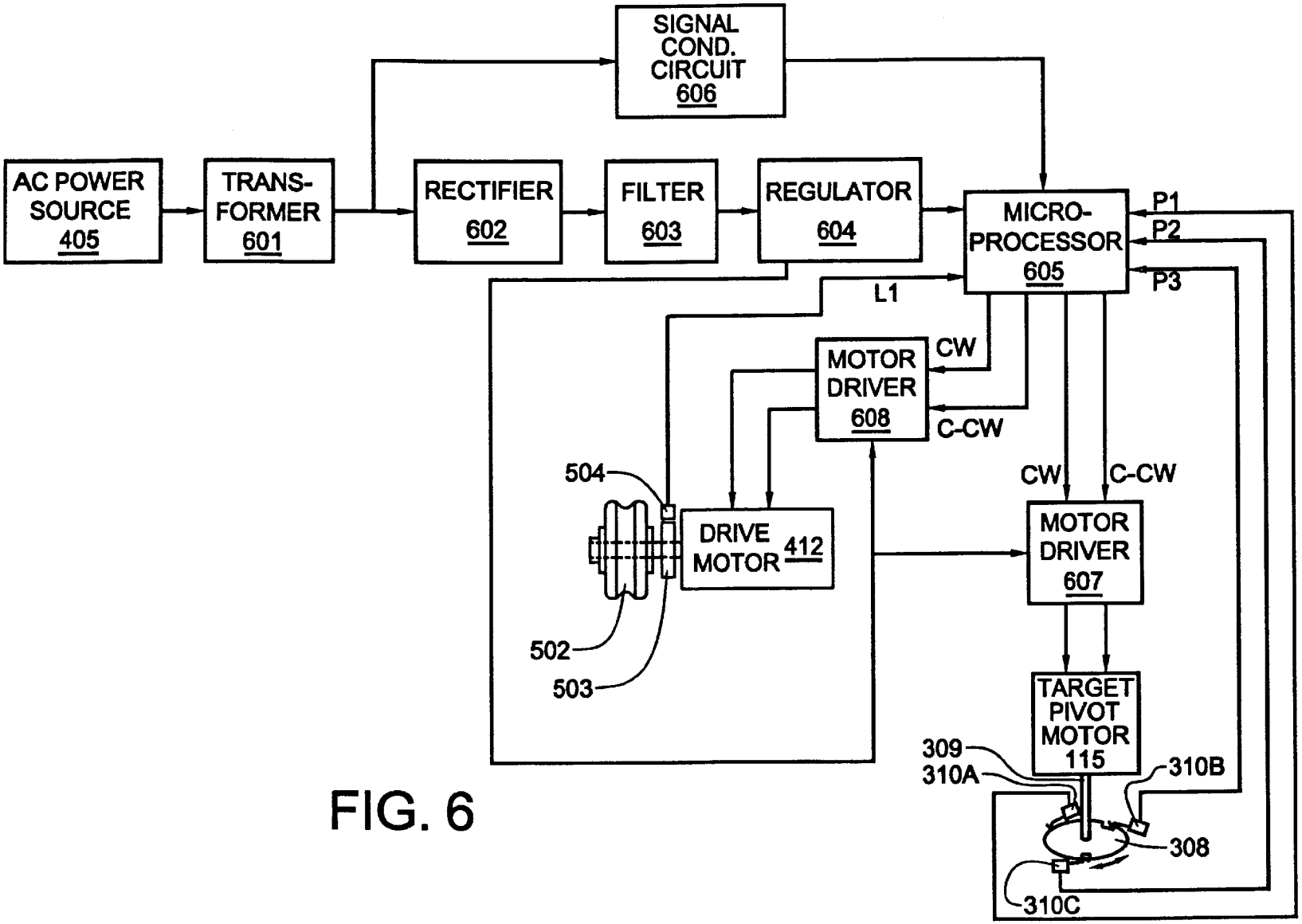
FIG. 6 is a block schematic diagram of the electrical circuitry and electrically-powered equipment employed in connection with the second embodiment of the improved movable target system.

Referring now to the block schematic diagram of FIG. 6, which is similar to that of FIG. 3, the circuitry 414 on board the target carrier 407 includes all circuit items labeled 602–608. The alternating current power source 405 is transformed by the insulated cable 418 (which functions as a primary transformer winding) and the inductor device 409 (which functions as a secondary transformer winding), which together constitute power transformer 601, into the induced alternating current received at terminal 411 and lead wire 415 (i.e., the outputs of inductor device 409). The induced AC current is rectified by diode rectifier circuit 602, filtered by filter circuit 603 and regulated by regulator circuit 604. The regulated DC current powers a microprocessor 605, which samples the frequency of the induced AC power through signal conditioning circuit 606. For a preferred embodiment of the invention, modulation involves alternating between two distinct frequencies so that a stream of serial binary data may be sent to the target carrier. The microprocessor 605 samples a pulsating DC signal at the received AC frequency from the signal conditioning circuit 606, decoding this pulsating signal into binary signals which, in turn, code for certain control functions on board the target carrier. For example, one decoded signal may direct the drive motor to move the carrier forward or backward. In response to another signal decoded from the induced AC and signals P1, P2 and P3 received from micro switches 213A, 213B and 213C, respectively, either a clockwise rotation signal or a counterclockwise rotation signal is sent from the microprocessor 605 to a motor driver circuit 607, which sends DC power to target-pivoting motor 116M in normal or reverse polarity until the desired target position is achieved. Motor driver circuit 608 controls drive motor 412. Drive motor 412 is responsible for bidirectional movement of the target carrier 407 along the track 401. As with motor driver circuit 607, either a clockwise rotation signal or a counterclockwise rotation signal is sent from microprocessor 605 to motor driver circuit 608. Drive motor 412 has a rotating pulse generator 503 attached to its output shaft 504. The pulses are monitored by sensor 504, which feeds information back to microprocessor 605 via signal line L1, so that the microprocessor 605 can keep track of the target carrier's position on the track 401. It should be mentioned that the drive motor of the embodiment depicted in FIG. 1 may also be equipped with a pulse generator and a sensor so that the position of the target carrier 108 may be monitored by a separate microprocessor offboard the target carrier 108. Additionally, it should be emphasized that all electrical equipment on board the target carrier is powered by the regulated DC current derived from the current induced in the inductor device 409. Nearly all the AC current induced in inductor device 409 is rectified, filtered and regulated to provide 5 volts DC, which is used to power all electrical equipment on board the target carrier 407. Only a tiny portion of the induced AC current is used as is for sampling the frequency of the AC power applied to cable 418.

Although only a single embodiment of the improved movable target system is depicted and described herein, it will be obvious to those having ordinary skill in the art that changes and modifications may be made thereto without departing from the scope and the spirit of the invention as hereinafter claimed. For example, although the preferred embodiments of the improved movable target system as heretofore described have been implemented as a target carrier movable along an overhead track, the system principles may be readily adapted to a system having a target carrier movable along a ground-supported track, or even as a trackless system, with the target carrier suspended on the conductive cable.

What is claimed is:

1. A movable target system comprising:

a target carrier movable between first and second locations, said carrier having onboard electrical equipment;

a [stationary] power supply [having first and second output connections]; and a power transmission system for transferring electrical power from the [stationary] power supply to the on board electrical equipment via at least two mutually-coupled inductors, one of which is movable with respect to another.

2. The movable target system of claim 1, wherein power is transferable while one of said inductors is moving with respect to another.

3. The movable target system of claim 2, wherein said pair of inductors includes:

a first inductor, which is an electrically-conductive cable; and a second inductor comprising:

a coil having at least one turn of wire, said wire having first and second ends which, respectively, form first and second leads; and a ferromagnetic core which at least partially surrounds said cable and which magnifies the inductance of said coil.

4. The movable target system of claim 2, wherein said core is toroidally-shaped.

5. The movable target system of claim 2, wherein said core is substantially in the shape of geometric solid enclosed by the surface generated by rotating a rectangle 360 degrees about an axis that is outside the rectangle, parallel to one side of the rectangle, and equiplanar with the rectangle.

6. The movable target system of claim 3, which further comprises a track on which said target carrier is movably mounted, said track having a full-length channel within which said cable is positioned along substantially the entire length of said track;

first and second power input connections on said target carrier to which said electrical equipment is electrically coupled*;* and wherein said cable is movable, having first and second ends respectively coupled to said first and second power input connections, said first and second ends each also being secured to said target carrier; and wherein said second inductor is stationary, having first and second leads [respectively] coupled to said [first and second connections of said stationary] power supply.

7. The movable target system of claim 6, which further comprises:

a first idler pulley longitudinally aligned with said channel and positioned outboard of said first location; and a drive pulley rotatably powered by a drive motor, said drive pulley aligned with said channel and positioned outboard of said second location; and wherein said cable is looped between said idler pulley and said drive pulley.

8. The movable target system of claim 7, which further comprises a second idler pulley mounted between said second location and said drive pulley, said second idler pulley engaging said cable and serving to maintain said cable within said channel, and wherein said second inductor is positioned between said drive pulley and said second idler pulley.

9. The movable target system of claim 8, wherein said electrical equipment includes at least one electric motor for moving a target and control circuitry for controlling the operation of said electric motor.

10. The movable target system of claim 9, wherein said electrical equipment further includes frequency sampling and decoding circuitry, and wherein the frequency of an induced alternating current in said cable matches that of an alternating current applied to said second inductor by said [stationary] power supply, and wherein the frequency of the applied alternating current is modulated to provide decodable signals at the target carrier which are sampled by said frequency sampling circuitry and decoded by said decoding circuitry to produce control signals for said control circuitry.

11. The movable target system of claim 10, wherein said electric motor, said control circuitry, said sampling circuitry, and said decoding circuitry are powered by direct current produced by rectifying at least some of said induced alternating current.

12. The movable target system of claim 3, which further comprises:

an electrically-conductive track on which said target carrier is movably mounted, said track having a full-length, upwardly-open channel within which said cable is positioned along substantially the entire length of said track;

a first cable anchoring device to which a first end of said cable is anchored, said first anchoring device being longitudinally aligned with said channel, positioned outboard of said first location, said first *end of said* cable [anchoring device] being coupled to [said first power output connection via] said track; and a second cable anchoring device to which the opposite, or second, end of said cable is anchored, said second anchoring device being longitudinally aligned with said channel and positioned outboard of said second location; said second *end of said* cable [anchoring device] being electrically coupled to said second power output connection; and wherein said second inductor is affixed to said target carrier *and said power supply has first and second output connections, said first output connection being coupled to said track, and said second output connection being coupled to the second end of said cable*.

13. The movable target system of claim 12, wherein said target carrier includes means for lifting a portion of said cable from said channel within the confines of said carrier as it moves along said track.

14. The movable target system of claim 13, wherein said means for lifting comprises:

first and second guide pulleys rotatably and rigidly affixed to said target carrier, said first and second guide pulleys being positioned at least partially within said channel; and at least one other guide pulley rotatably and rigidly affixed to said carrier at a level above said first and second guide pulleys, said cable being routed from said *first* cable anchoring device, beneath said first guide pulley, out of said channel and over said at least one other guide pulley, into said channel and under said second guide pulley, then to said [first power output terminal] *second cable anchoring device*, said cable passing through said [first inductor] while *said cable* is out of said channel.

15. The movable target system of claim [14] *12*, where said electrical equipment includes a drive motor for driving said target carrier along said track, at least one target movement motor, and control circuitry for controlling the operation of said drive motor and said at least one target movement motor.

16. The movable target system of claim 15, wherein said electrical equipment further includes frequency sampling and decoding circuitry, and wherein the frequency of the induced alternating current in the second inductor matches that of [the] *a* source alternating current *output by said power supply*, and wherein the frequency of the source alternating current is modulated to provide decodable signals at the target carrier which are sampled by said frequency sampling circuitry and decoded by said decoding circuitry to produce control signals for said control circuitry.

17. The movable target system of claim 16, wherein the source alternating current is modulated to provide a stream of serial binary data.

18. A movable target system comprising:

a track having a channel extending substantially the full length thereof;

a target carrier movably mounted on said track between first and second locations, said carrier having first and second power-input connections and onboard electrical equipment coupled to said first and second power-input connections;

a first idler pulley longitudinally aligned with said channel and positioned outboard of said first location;

a drive pulley rotatably powered by a drive motor, said drive pulley longitudinally aligned with said channel and positioned outboard of said second location;

a stationary power supply having first and second power output connections;

an electrically-conductive drive cable having a first end that is both electrically coupled to said first power-input connection and secured to said carrier, said drive cable also having a second end that is both electrically coupled to said second power-input connection and secured to said carrier, said cable being looped between said idler pulley and said drive pulley, said cable being positioned within said channel between first and second locations; and an input inductance device that is stationary with respect to said track, said device having a coil with at least one turn of wire, said wire having first and second ends respectively coupled to first and second power output connections; and a ferromagnetic core which at least partially surrounds said cable and which magnifies the inductance of said coil.

19. The movable target system of claim 18, wherein said core is toroidally-shaped.

20. The movable target system of claim 18, wherein said core is substantially in the shape of geometric solid enclosed by the surface generated by rotating a rectangle 360 degrees about an axis that is outside the rectangle, parallel to one side of the rectangle, and equiplanar with the rectangle.

21. The movable target system of claim 18, which further comprises a second idler pulley mounted between said second location and said drive pulley, said second idler pulley engaging said cable and serving to maintain said cable within said channel.

22. The movable target system of claim 18, wherein said electrical equipment includes control circuitry and at least one electric motor for moving a target, said control circuitry controlling the operation of said electric motor.

23. The movable target system of claim 22, wherein said electrical equipment further includes frequency sampling and decoding circuitry, and wherein the frequency of an induced alternating current in said cable matches that of a source alternating current, output by said power supply to first and second power output connections, and wherein the frequency of the source alternating current is modulated to provide decodable signals at the target carrier which are sampled by said frequency sampling circuitry and decoded by said decoding circuitry to produce control signals for said control circuitry.

24. The movable target system of claim 23, wherein said electric motor, said control circuitry, said sampling circuitry, and said decoding circuitry are powered by direct current produced by rectifying at least some of said induced alternating current.

25. A movable target system comprising:

an electrically-conductive track having an upwardly-open channel extending substantially the full length thereof;

a target carrier movably mounted on said track between first and second locations, said carrier having first and second input connections and onboard electrical equipment coupled to said input connections;

a stationary power supply having first and second power output connections;

an electrically-conductive cable having first and second ends, said cable being positioned within said channel between said first and second locations, except within the confines of said target carrier;

an output inductance device mounted on and stationary with respect to said target carrier, said device having a coil with at least one turn of wire, said wire having first and second ends respectively coupled to first and second power output connections; and a ferromagnetic core which at least partially surrounds said cable, and which magnifies the inductance of said coil, a first cable anchoring device to which said first end of said cable is anchored, said first anchoring device being longitudinally aligned with said channel, positioned outboard of said first location, said first *end of said* cable [anchoring device] being coupled to said first power output connection via said track; and a second cable anchoring device to which said second end of said cable is anchored, said second anchoring device being longitudinally aligned with said channel and positioned outboard of said second location; said second *end of said* cable [anchoring device] being electrically coupled to said second power output connection.

26. The movable target system of claim 25, wherein said core is toroidally-shaped.

27. The movable target system of claim 25, wherein said core is substantially in the shape of geometric solid enclosed by the surface generated by rotating a rectangle 360 degrees about an axis that is outside the rectangle, parallel to one side of the rectangle, and equiplanar with the rectangle.

28. The movable target system of claim 25, wherein said first cable anchoring device incorporates a cable tensioner.

29. The movable target system of claim 25, wherein said target carrier includes means for lifting a portion of said cable from said channel within the confines of said carrier as it moves along said track.

30. The movable target system of claim 29, wherein said means for lifting comprises:

first and second guide pulleys rotatably and rigidly affixed to said target carrier, said first and second guide pulleys being positioned at least partially within said channel; and at least one other guide pulley rotatably and rigidly affixed to said carrier at a level above said first and second guide pulleys, said cable being routed from said first cable anchoring device, beneath said first guide pulley, out of said channel and over said at least one other guide pulley, into said channel and under said second guide pulley, then to said second cable anchoring device, said cable passing through said [output inductance device] *ferromagnetic core* while said cable is out of said channel.

31. The movable target system of claim 25, where said electrical equipment includes a drive motor for driving said target carrier along said track, at least one target movement motor, and control circuitry for controlling the operation of said drive motor and said at least one target movement motor.

32. The movable target system of claim 31, wherein said electrical equipment further includes frequency sampling and decoding circuitry, and wherein the frequency of an induced alternating current in said output inductance device matches that of a source alternating current output by said power supply to first and second power output connections, and wherein the frequency of said source alternating current is modulated to provide decodable signals at the target carrier which are sampled by said frequency sampling circuitry and decoded by said decoding circuitry to produce control signals for said control circuitry.

33. The movable target system of claim 32, wherein said source alternating current is modulated to provide a stream of serial binary data.

34. The movable target system of claim 25, wherein at least a portion of said induced alternating current is rectified to direct current and used to power at least a portion of said electrical equipment.

* * * * *